(12) United States Patent
Benko et al.

(10) Patent No.: US 10,290,153 B2
(45) Date of Patent: *May 14, 2019

(54) DYNAMIC HAPTIC RETARGETING

(71) Applicant: Microsoft Technology Licensing, LLC, Redmond, WA (US)

(72) Inventors: Hrvoje Benko, Seattle, WA (US); Andrew D. Wilson, Seattle, WA (US); Eyal Ofek, Redmond, WA (US); Mahdi Azmandian, Los Angeles, CA (US); Mark Hancock, Kitchener (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/703,093

(22) Filed: Sep. 13, 2017

(65) Prior Publication Data

US 2018/0005451 A1     Jan. 4, 2018

Related U.S. Application Data

(63) Continuation of application No. 15/135,345, filed on Apr. 21, 2016, now Pat. No. 9,805,514.

(51) Int. Cl.
   *G06T 19/00*     (2011.01)
   *G06F 3/01*      (2006.01)

(52) U.S. Cl.
   CPC ............ *G06T 19/006* (2013.01); *G06F 3/011* (2013.01)

(58) Field of Classification Search
   CPC .......... G06F 3/011–3/015; G06F 3/016; G06F 3/017; G06F 2203/01–2203/015; G06T 19/006
   See application file for complete search history.

(56) References Cited

U.S. PATENT DOCUMENTS

| | | |
|---|---|---|
| 5,831,584 A | 11/1998 | Socks et al. |
| 7,225,404 B1 | 5/2007 | Zilles et al. |
| 9,805,514 B1 | 10/2017 | Benko et al. |
| 2012/0113223 A1 | 5/2012 | Hilliges et al. |
| 2014/0071165 A1 | 3/2014 | Tuchschmid et al. |
| 2016/0357266 A1 | 12/2016 | Patel et al. |

(Continued)

OTHER PUBLICATIONS

Achibet et al., "Elastic-Arm: Human-scale Passive Haptic Feedback for Augmenting Interaction and Perception in Virtual Environments", In Proceedings of IEEE Virtual Reality Conference, Mar. 23, 2015, pp. 63-66). (Year: 2015).*

(Continued)

*Primary Examiner* — Diane M Wills
(74) *Attorney, Agent, or Firm* — Schwegman Lundberg & Woessner, P.A.

(57) ABSTRACT

Dynamic haptic retargeting can be implemented using world warping techniques and body warping techniques. World warping is applied to improve an alignment between a virtual object and a physical object, while body warping is applied to redirect a user's motion to increase a likelihood that a physical hand will reach the physical object at the same time a virtual representation of the hand reaches the virtual object. Threshold values and/or a combination of world warping a body warping can be used to mitigate negative impacts that may be caused by using either technique excessively or independently.

20 Claims, 13 Drawing Sheets

(56) References Cited

U.S. PATENT DOCUMENTS

2017/0309071 A1  10/2017  Benko et al.

OTHER PUBLICATIONS

Kohli et al., "Redirected Touching: The Effect of Warping Space on Task Performance", In Proceedings of IEEE Symposium on 3D User Interfaces, Mar. 4, 2012, pp. 105-112. (Year: 2012).*
Corsten, et al., "Instant User Interfaces: Repurposing Everyday Objects as Input Devices", In Proceedings of ACM International Conference on Interactive Tabletops and Surfaces, Oct. 6, 2013, pp. 71-80.
Conti, et al., "Spanning Large Workspaces Using Small Haptic Devices", In Proceedings of First Joint Eurohaptics Conference and Symposium on Haptic Interfaces for Virtual Environment and Teleoperator Systems, Mar. 18, 2005, 6 Pages.
"USC Institute for Creative Technologies", Retrieved From <<http://projects.ict.usc.edu/mxr/elements/>>, Jun. 9, 2013,16 Pages.
"Non Final Rejection Issued in U.S. Appl. No. 15/135,345", dated Apr. 5, 2017, 20 Pages.
"Corrected Notice of Allowance Issued in U.S. Appl. No. 15/135,345", dated Sep. 15, 2017,10 Pages.
"Notice of Allowance Issued in U.S. Appl. No. 15/135,345", dated Jun. 15, 2017, 9 Pages.
Achibet, et al., "Elastic-Arm: Human-Scale Passive Haptic Feedback for Augmenting Interaction and Perception in Virtual Environments", In Proceedings of IEEE Virtual Reality Conference, Mar. 23, 2015, pp. 63-68.
Ban, et al., "Modifying an Identified Angle of Edged Shapes Using Pseudo-haptic Effects", In International Conference on Haptics: Perception, Devices, Mobility, and Communication, Jun. 13, 2012, pp. 25-36.
Baudisch, et al., "Drag-and-Pop and Drag-and-Pick: Techniques for Accessing Remote Screen Content on Touch and Pen-operated Systems", In Proceedings of international conference on Human computer interaction, vol. 3, Aug. 2003, 8 Pages.
Blom, et al., "The Effects of Rotating the Self Out of the Body in the Full Virtual Body Ownership Illusion", In Journal of Perception, vol. 43, Issue 4, Apr. 2014, pp. 275-294.
Bruder, et al., "Impact of Gender on Discrimination Between Real and Virtual Stimuli", In Workshop on Perceptual Illusions in Virtual Environments, Mar. 2009, 6 Pages.
Burns,, et al., "MACBETH: The avatar which I see before me and its movement toward my hand", In Proceedings of IEEE Virtual Reality Conference, Mar. 10, 2007, pp. 295-296.
Fitzmaurice, et al., "Bricks: Laying the Foundations for Graspable User Interfaces", In Proceedings of the SIGCHI Conference on Human Factors in Computing Systems, CHI '95, May 7, 1995, pp. 442-449.
Friihlich, et al., "The Cubic Mouse: A New Device for Three-Dimensional Input", In Proceedings of SIGCHI Conference on Human Factors in Computing Systems, vol. 2, Issue 1, Apr. 1, 2000, pp. 526-531.
Gibson, James J., "Adaptation, After-Effect and Contrast in the Perception of Curved Lines", In Journal of Experimental Psychology, vol. 16, Issue 1, Feb. 1933, pp. 1-31.
Goble, et al., "Two-Handed Spatial Interface Tools for Neurosurgical Planning", In Journal of Computer, vol. 28, Issue 7, Jul. 1995, pp. 20-26.
Helbig, et al., "Optimal Integration of Shape Information from Vision and Touch", In Journal of Experimental Brain Research, vol. 179, Issue 4, Jan. 16, 2007, pp. 595-606.
Henderson, et al., "Opportunistic Controls: Leveraging Natural Affordances as Tangible User Interfaces for Augmented Reality", In Proceedings of the ACM Symposium on Virtual Reality Software and Technology, Oct. 27, 2008, pp. 211-218.
Hinckley, et al., "Passive Real-world Interface Props for Neurosurgical Visualization", In Proceedings of the SIGCHI Conference on Human Factors in Computing Systems, Apr. 24, 1994, pp. 452-458.
Hollis, et al., "A Six-Degree-of-Freedom Magnetically Levitated Variable Compliance Fine-Motion Wrist: Design Modeling, and Control", In Proceedings of IEEE Transactions on Robotics and Automation, vol. 7, Issue 3, Jun. 1991, pp. 320-332.
Insko, Brent Edward, "Passive Haptics Significantly Enhances Virtual Environments", In Doctoral Dissertation of University of North Carolina, Apr. 2001, 111 pages.
Kilteni, et al., "Extending Body Space in Immersive Virtual Reality: A Very Long Arm Illusion", In Journal of Plos One, vol. 7, Issue 7, Jul. 19, 2012, pp. 1-15.
Kilteni, et al., "Over my fake body: body ownership illusions for studying the multisensory basis of own-body perception", In Journal of Frontiers in Human Neuroscience, vol. 9, Mar. 24, 2015, pp. 1-20.
Kitahara,, et al., "Sensory Properties in Fusion of Visual/Haptic Stimuli Using Mixed Reality", In Journal of Advances in Haptics, Apr. 1, 2010, pp. 565-583.
Klatzky, et al., "Spatial Updating of Self-Position and Orientation During Real, Imagined, and Virtual Locomotion", In Journal of Psychological Science, vol. 9, Issue 4, Jul. 1998, pp. 293-298.
Witmer, et al., "Measuring Presence in Virtual Environments: A Presence Questionnaire", In Journal of Presence Teleoperators and Virtual Environments, vol. 7, No. 3, Jun. 1998, pp. 225-240.
Kohli, et al., "Combining Passive Haptics with Redirected Walking", In Proceedings of the International Conference on Augmented Tele-existence, Dec. 5, 2005, pp. 253-254.
Kohli, Luv, "Exploiting Perceptual Illusions to Enhance Passive Haptics", In Proceedings of IEEE VR Workshop on Perceptual Illusions in Virtual Environments, Mar. 15, 2009, 3 Pages.
Kohli, Luv, "Redirected Touching", In Doctoral Dissertation of University of North Carolina, Retrieved On: Feb. 17, 2016, 138 pages.
Kohli, et al., "Redirected Touching: The Effect of Warping Space on Task Performance", In Proceedings of IEEE Symposiumon on 3D User Interfaces, Mar. 4, 2012, pp. 105-112.
Kohli,, et al., "Redirected Touching: Training and Adaptation in Warped Virtual Spaces", In Proceedings of IEEE Symposium on 3D User, Mar. 16, 2013, pp. 79-86.
Kohli,, et al., "Redirected Touching: Warping Space to Remap Passive Haptics", In Proceedings of IEEE Symposium on 3D User Interfaces, Mar. 20, 2010, pp. 129-130.
Kohli, Luv, "Warping Virtual Space for Low-Cost Haptic Feedback", In Proceedings of the ACM SIGGRAPH Symposium on Interactive 3D Graphics and Games, Mar. 21, 2013, pp. 195.
Lecuyer, et al., "Pseudo-Haptic Feedback: Can Isometric Input Devices Simulate Force Feedback?", In Proceedings IEEE Virtual Reality, Mar. 18, 2000, 8 Pages.
Likert, Rensis, "A Technique for the Measurement of Attitudes", In Journal of Archives of Psychology, vol. 22, Issue 140, Jun. 1932, 53 pages.
McNeely, William A., "Robotic Graphics: a New Approach to Force Feedback for Virtual Reality", In Proceedings of IEEE Virtual Reality Annual International Symposium, Sep. 18, 1993, pp. 336-341.
Miles, Walter R., "Ocular Dominance in Human Adults", In Journal of General Psychology, vol. 3, Issue 3, Jan. 1930, pp. 412-430.
"International Search Report and Written Opinion Issued in PCT Application No. PCT/US2017/027836", dated Aug. 7, 2017,12 Pages.
Razzaque, et al., "Redirected Walking", In Proceedings of EUROGRAPHICS, vol. 9, Sep. 2001, 6 Pages.
Rock, et al., "Vision and Touch: An Experimentally Created Confilict Between the Two Senses", In Journal of Science, vol. 143, Issue 3606, Feb. 7, 1964, pp. 594-596.
Sheng, et al., "An Interface for Virtual 3D Sculpting via Physical Proxy", In Proceedings of the 4th International conference on Computer graphics and interactive techniques in Australasia and Southeast Asia, Nov. 29, 2006, 8 Pages.
Simeone, et al., "Substitutional Reality: Using the Physical Environment to Design Virtual Reality Experiences", In Proceedings of the 33rd Annual ACM Conference on Human Factors in Computing Systems, Apr. 18, 2015, pp. 3307-3316.

(56) References Cited

OTHER PUBLICATIONS

Spanlang, et al., "How to Build an Embodiment Lab: Achieving Body Representation Illusions in Virtual Reality", In Technology Report of Frontiers in Robotics and AI, vol. 1, Issue 9, Nov. 27, 2014, pp. 1-22.
Spillmann, et al., "Adaptive Space Warping to Enhance Passive Haptics in an Arthroscopy Surgical Simulator", Proceedings of IEEE Transactions on Visualization and Computer Graphics, vol. 19, Issue 4, Apr. 2013, pp. 626-633.
Steinicke, et al., "Estimation of Detection Thresholds for Redirected Walking Techniques", In Proceedings of IEEE Transactions on Visualization and Computer Graphics, vol. 16, Issue 1, Jan. 2010, pp. 17-27.
Steinicke, et al., "Taxonomy and Implementation of Redirection Techniques for Ubiquitous Passive Haptic Feedback", In Proceedings of the International Conference on Cyberworlds, Sep. 22, 2008, 7 Pages.
Ware, et al., "Rotating Virtual Objects with Real Handles", In Journal of ACM Transactions on Computer-Human Interaction, vol. 6, Issue 2, Jun. 1999, pp. 162-180.

\* cited by examiner

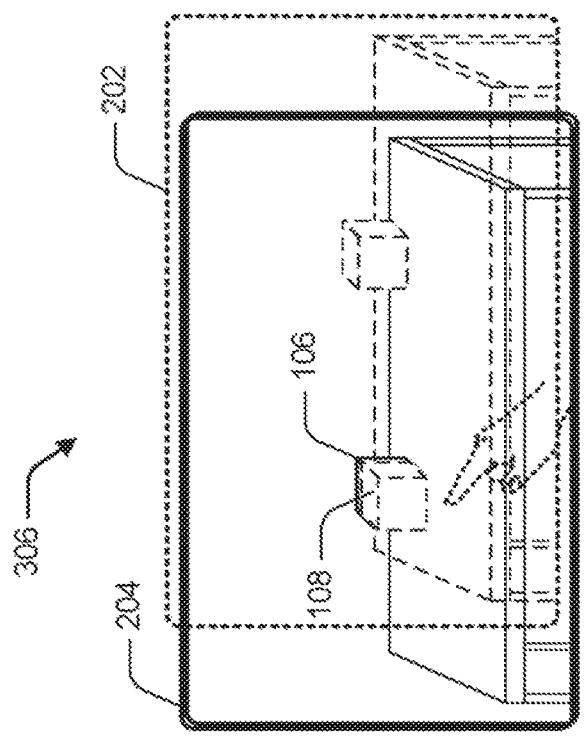
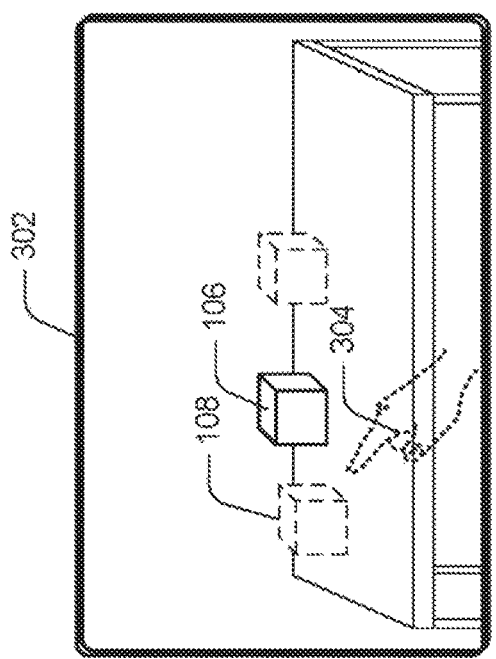
FIG. 3

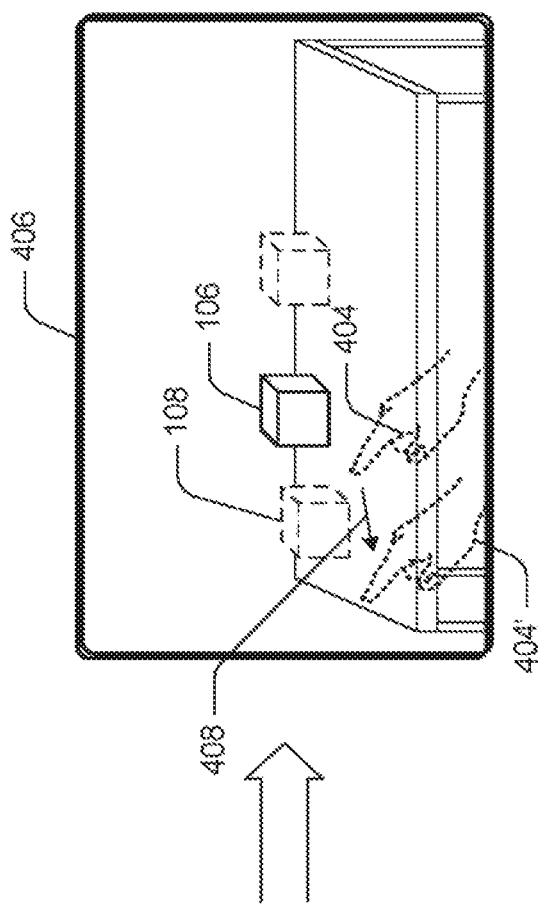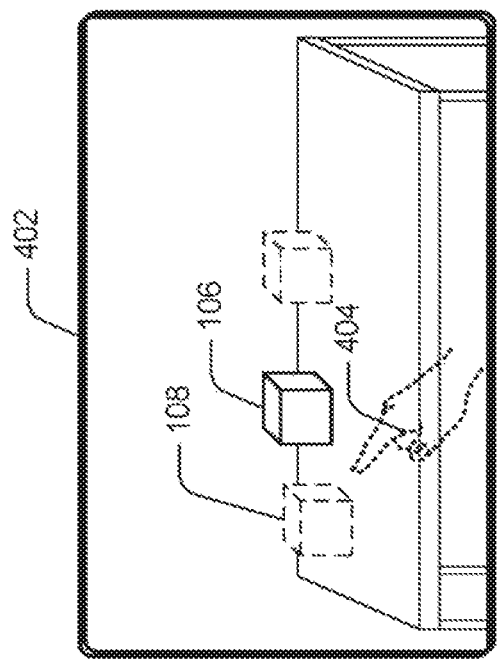
FIG. 4

DYNAMIC HAPTIC RETARGETING

CLAIM OF PRIORITY

This patent application is a continuation of U.S. application Ser. No. 15/135,345, filed on Apr. 21, 2016, which is incorporated herein by reference in its entirety.

BACKGROUND

Virtual reality systems are becoming ever more popular, with consumer-level head-mounted displays and motion tracking devices leading to the creation of a large number of immersive experiences. A primary objective in many virtual reality systems is to establish a sense of presence for the user. While optics, rendering, and audio technologies have improved substantially, resulting in photorealistic renderings through which users can be convinced by the illusion of reality, a sense of touch expected when reaching out and grabbing virtual objects is still lacking.

Haptics is a term used to represent various aspects of a user's sense of touch. One method for enabling users to experience a sense of touch when interacting with virtual objects is referred to herein as passive haptics. Mapping respective physical objects to each virtual object with which a user is expected to interact can result in a compelling tactile sensation when reaching out and touching a virtual object. However, this illusion requires each virtual object to have a corresponding physical prop of the same size and shape and in the same location. This can result in a very complicated physical environment, and keeping the physical environment synchronized with the virtual environment can be difficult or even impossible.

SUMMARY

This disclosure describes techniques for dynamic haptic retargeting. A single physical object can be mapped to multiple virtual objects such that when a user reaches out to touch any one of the virtual objects, the dynamic haptic retargeting techniques result in redirection of the user's physical movement so that, when it appears to the user that they are touching the virtual object, they are actually touching the physical object. A variety of techniques can be used to implement dynamic haptic retargeting, including, but not limited to, world warping, body warping, and a combination of world and body warping.

According to an example world warping technique, the virtual environment is shifted with regard to the physical environment, for example, by translation or rotation. According to an example body warping technique, the virtual representation of a user's hand is manipulated to passively redirect the user's physical motions while reaching for a virtual object.

In at least some scenarios, by applying a combination of world warping and body warping and/or by enforcing a maximum warp for either or both, negative effects such as detectable world warping, motion sickness, and/or virtual body misalignment may be reduced.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 is a pictorial diagram illustrating an example of world warping.

FIG. 4 is a pictorial diagram illustrating an example of body warping.

DETAILED DESCRIPTION

Overview

Figure 1:
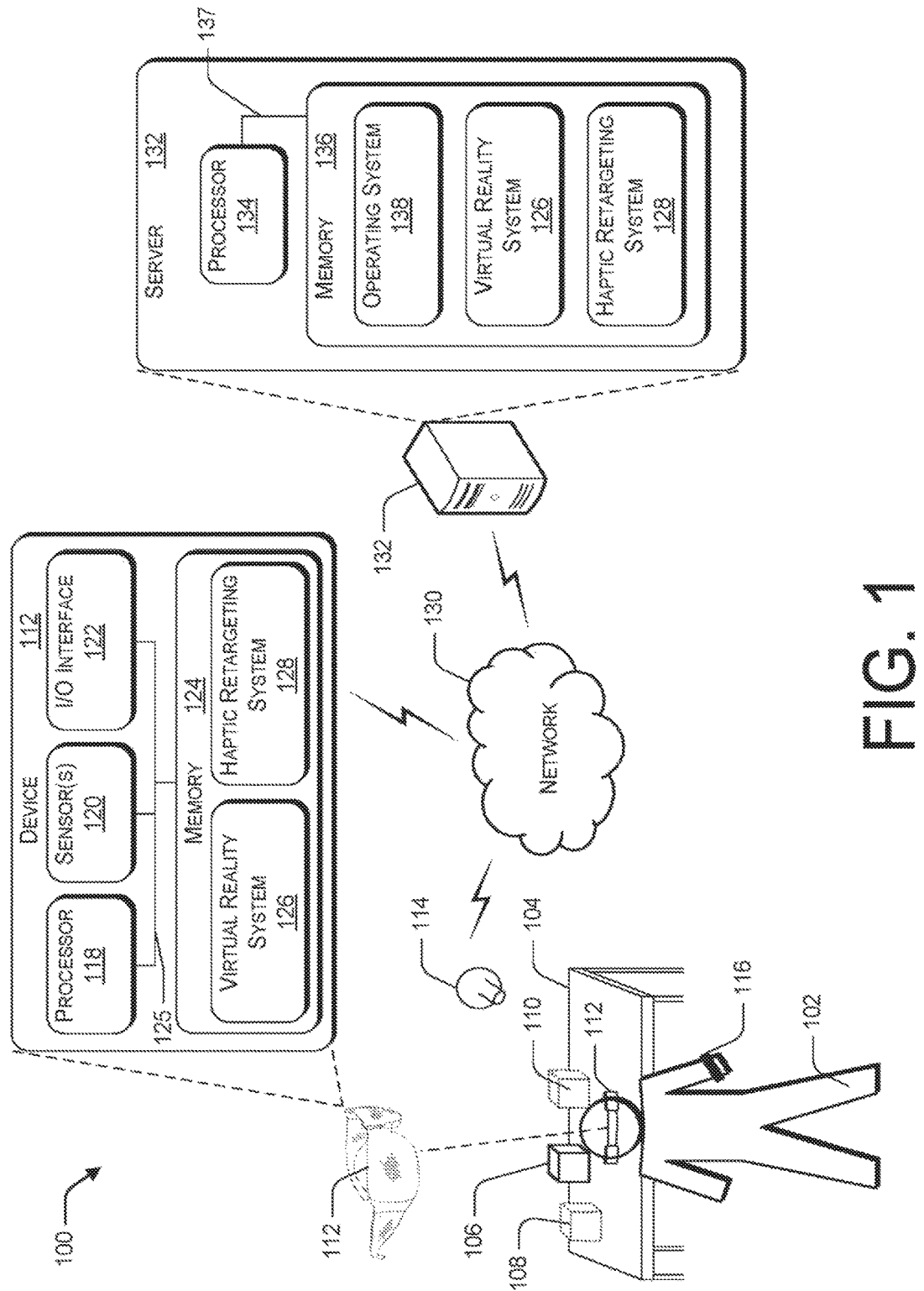
FIG. 1 is a pictorial diagram illustrating an example environment in which dynamic haptic retargeting can be implemented.

Techniques for dynamic haptic retargeting are described herein. When a user is interacting with a virtual reality or mixed reality environment, repurposing a single physical object to provide passive haptic sensation for a variety of virtual objects, can increase the user's sense of presence within the environment and can increase the overall quality of the experience. As an example, a user may be interacting with a virtual reality environment that includes multiple similar objects. As defined within the virtual reality environment, the virtual objects can be picked up and their positions manipulated by the user. Using the dynamic haptic retargeting techniques described herein, a single physical object having similar size and shape to the virtual objects represented in the virtual reality can be used to provide passive haptic feedback to the user when the user touches any of the virtual objects.

Dynamic haptic retargeting enables a single physical object to be mapped to multiple virtual objects by altering the user's perception of the user's physical position with respect to the virtual environment. For example, if there are two virtual objects and both are mapped to a single physical object, as the user reaches for either of the virtual objects, the user's physical movements are dynamically redirected toward the single physical object, while visually the user sees a virtual representation of the user's hand reaching toward the virtual object the user has chosen.

Dynamic haptic retargeting techniques, as described herein, include world warping, body warping, and a combination of the two. According to a world warping technique, as a user reaches for a virtual object, the virtual environment with which the user is interacting is rotated to align a position of the virtual object with a position of the physical object. According to a body warping technique, as a user reaches for a virtual object, a position of a virtual representation of the user's hand and arm within the virtual environment is altered, causing the user to adjust the direction of their movement so that the user's hand reaches the physical object as the virtual representation of the user's hand reaches the virtual object.

Both world warping and body warping techniques have drawbacks. For example, if applied excessively, world warping can cause the user to feel motion sickness. Furthermore, even smaller amounts of world warping (e.g., not significant enough to cause motion sickness) may be visibly detected by a user, which may result in the user becoming aware that the physical object is not the same as the virtual object. As another example, if applied excessively, body warping can result in a virtual representation of the user's arm or hand that appears out of alignment with the rest of the user's body or the virtual representation of the user's arm may appear unnaturally deformed.

Effective haptic retargeting can be achieved by dynamically applying world warping, body warping, or a combination of world warping and body warping as a user interacts with a virtual environment.

Illustrative Environment

FIG. 1 illustrates an example environment 100 in which dynamic haptic retargeting can be implemented. In the illustrated example, a user 102 is in a physical environment, which includes a table 104 and a physical object 106. A virtual environment is mapped to the physical environment, and includes virtual object 108 and virtual object 110.

Example environment 100 also include any number of a devices to enable the user 102 to interact with the virtual environment. For example, example environment 100 includes device 112, implemented as a head-mounted display, camera 114, and hand tracking device 116.

Device 112 is illustrated as a head-mounted display, but is representative of any device that enables a user to interact with virtual objects in a virtual environment. In the illustrated example, device 112 includes a processor 118, one or more sensors 120, input interface 122, and memory 124, each operably connected to the others such as via a bus 125. Bus 125 may include, for example, one or more of a system bus, a data bus, an address bus, a PCI bus, a Mini-PCI bus, and any variety of local, peripheral, and/or independent buses.

Processor 118 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs). System-on-a-chip systems (SOCs), Complex Programmable Logic Devices (CPLDs), etc.

Sensors 120 may include, for example, a depth map sensor, a camera, a light field sensor, a gyroscope, a sonar sensor, an infrared sensor, a compass, an accelerometer, and/or any other component for detecting a position or movement of the device 112 and/or other objects. Sensors 120 can also enable the generation of data characterizing interactions, such as user gestures, with the device 112.

I/O (input/output) interface 122 is configured to enable device 112 to receive input or send output. For example, input may be received via a touch screen, a camera to receive gestures, a microphone, a keyboard, a mouse, or any other type of input device. Similarly, for example, output may be presented via a display, speakers, or any other output device.

Memory 124 can store instructions executable by the processor 118. For example, memory 124 can store a virtual reality system 126 that can be executed to enable user interaction with virtual objects within a virtual environment. Furthermore memory 124 can store a haptic retargeting system 128 that can be executed to support user interaction with the virtual environment through the use of dynamic haptic retargeting.

Camera 114 may be implemented to capture motions of the user. Data generated by camera 114 may then be used, for example, to generate a virtual representation of a user's hand within the virtual environment. In an example implementation, data from camera 114 is communicated to haptic retargeting system 128 via, for example, a network 130.

Example environment 100 may also include a server computer system 132. Example server 132 includes a processor 134 and a memory 136, operably connected to each other such as via a bus 137. Bus 137 may include, for example, one or more of a system bus, a data bus, an address bus, a PCI bus, a Mini-PCI bus, and any variety of local, peripheral, and/or independent buses. An operating system 138 and all or part of virtual reality system 126 and/or haptic retargeting system 128 may be stored in memory 136 and executed on processor 134.

Memory 124 and memory 136 are examples of computer-readable media. As described above, memory 124 and memory 136 can store instructions executable by processors 118 and 134. Computer-readable media (e.g., memory 124 and/or memory 136) can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in device 112, while in some examples one or more of a CPU, GPU, and/or accelerator is external to device 112.

Computer-readable media may include computer storage media and/or communication media. Computer storage media can include volatile memory, nonvolatile memory, and/or other persistent and/or auxiliary computer storage media, removable and non-removable computer storage media implemented in any method or technology for storage of information such as computer-readable instructions, data structures, program modules, or other data. Memory 124 and memory 136 can be examples of computer storage media. Thus, the memory 124 and memory 136 includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Device 112 and/or server 130 can belong to a variety of categories or classes of devices such as traditional server-type devices, desktop computer-type devices, mobile-type devices, special purpose-type devices, embedded-type devices, and/or wearable-type devices. Thus, although illustrated as a single type of device, device 112 and server 130 can include a diverse variety of device types and are not limited to a particular type of device. Device 112 and server 130 can represent, but are not limited to, desktop computers, server computers, web-server computers, personal computers, mobile computers, laptop computers, tablet computers, wearable computers, implanted computing devices, telecommunication devices, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Network 128 can include, for example, public networks such as the Internet, private networks such as an institutional and/or personal intranet, or some combination of private and public networks. Network 128 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network 128 can utilize communications protocols, including packet-based and/or datagram-based protocols such as internet protocol (IP), transmission control protocol (TCP), user datagram protocol (UDP), or other types of protocols. Moreover, network 128 can also include a number of devices that facilitate network communications and/or form a hardware basis for the networks, such as switches, routers, gateways, access points, firewalls, base stations, repeaters, backbone devices, and the like.

In some examples, network 128 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

Figure 2:
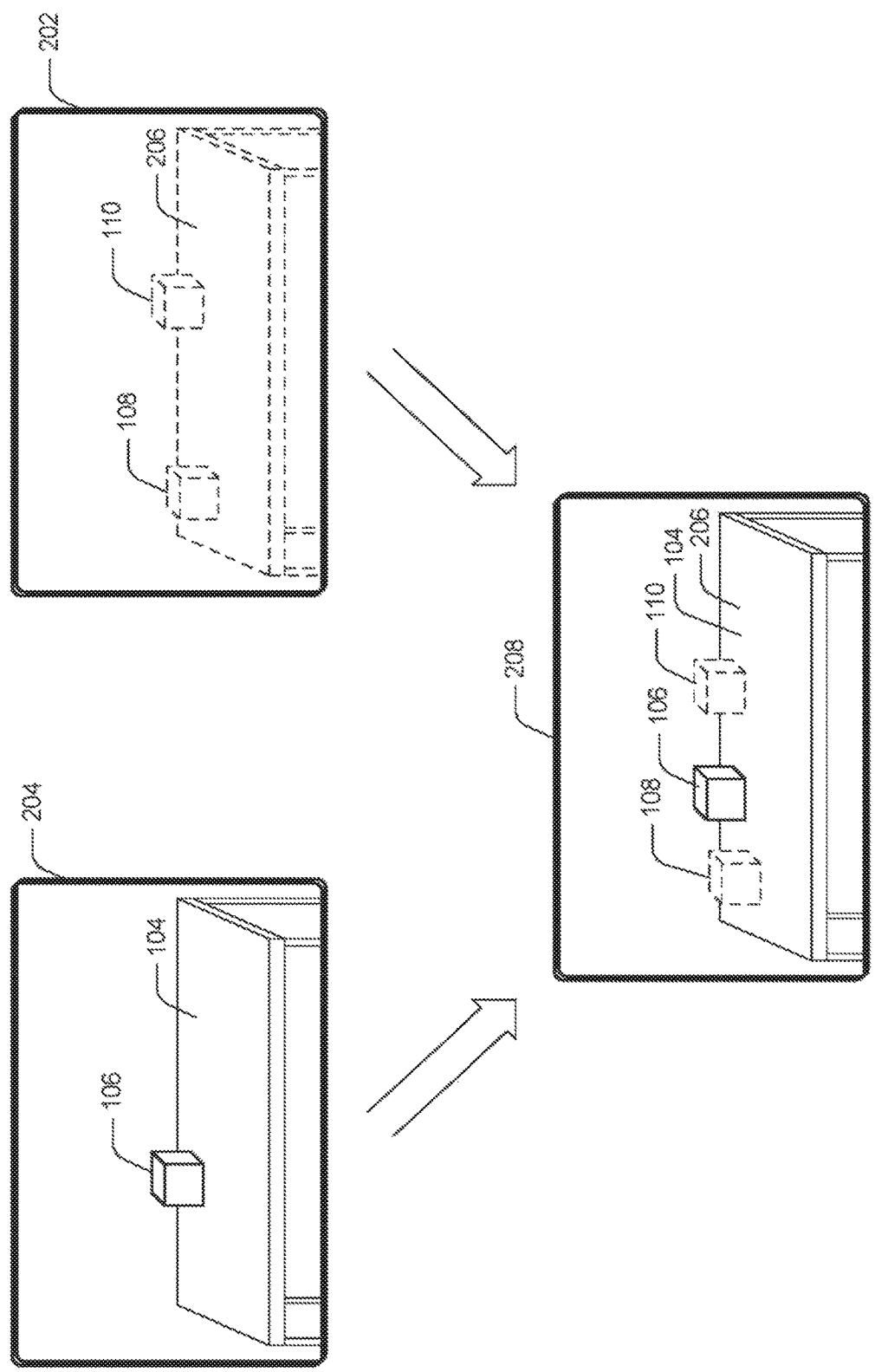
FIG. 2 is a pictorial diagram illustrating an example mapping of a virtual environment to a physical environment.

FIG. 2 illustrates an example mapping of a virtual environment 202 to a physical environment 204. As discussed above with reference to FIG. 1, physical environment 204 includes a table 104 and a physical object 106, illustrated as a block or cube. Similarly, virtual environment 202 includes a virtual table 206, virtual object 108, and virtual object 110. View 208 illustrates the virtual environment 202 mapped onto the physical environment 204 such that table 104 and virtual table 206 are aligned, and each of physical object 106 and virtual objects 108 and 110 appear to be resting on the table.

Although not illustrated, device 112, camera 114, and server 132 may each also include a network interface to facilitate communication via network 130.

World Warping and Body Warping

FIG. 3 illustrates an example of dynamic world warping as a user reaches toward a virtual object. View 302 corresponds to view 208 of FIG. 2, which illustrates a virtual environment mapped onto a physical environment. Furthermore, view 302 includes a virtual representation of a user's hand 304, as the user reaches toward virtual object 108. Because physical object 106 and virtual object 108 are not aligned with one another, if the reaches for virtual object 108, the user will not physically come in contact with physical object 106. World warping is a technique that can be used to enable dynamic haptic retargeting by realigning the virtual environment 202 with the physical environment 204 so that the virtual object 108 being reached for is aligned with the physical object 106. View 306 illustrates a result of applying a world warping to move the virtual environment 202 with respect to the physical environment 204 to align virtual object 108 with physical object 106.

FIG. 4 illustrates an example of dynamic body warping as a user reaches toward a virtual object. View 402 corresponds to view 208 of FIG. 2, which illustrates a virtual environment mapped onto a physical environment. Furthermore, view 402 includes a virtual representation of a user's hand 404, as the user reaches toward virtual object 108. As in the scenario described above with reference to FIG. 3, because physical object 106 and virtual object 108 are not aligned with one another, if the user reaches for virtual object 108, the user will not physically come in contact with physical object 106. Body warping is another technique that can be used to enable dynamic haptic retargeting by altering the location of the virtual representation of the user's hand 404 to cause the user to change their physical motion such that the user's physical hand will come in contact with physical object 106 when the virtual representation of the user's hand 404 comes in contact with the virtual object 108.

View 406 illustrates an example body warping in which the virtual representation of the user's hand 404 is moved to the left 408 to a new location 404'. Based on this adjustment, the user will physically move their hand further to the right, thereby physically reaching for the physical object 106 while it appears the virtual representation of the user's hand 404' is reaching for the virtual object 108.

Figure 5:
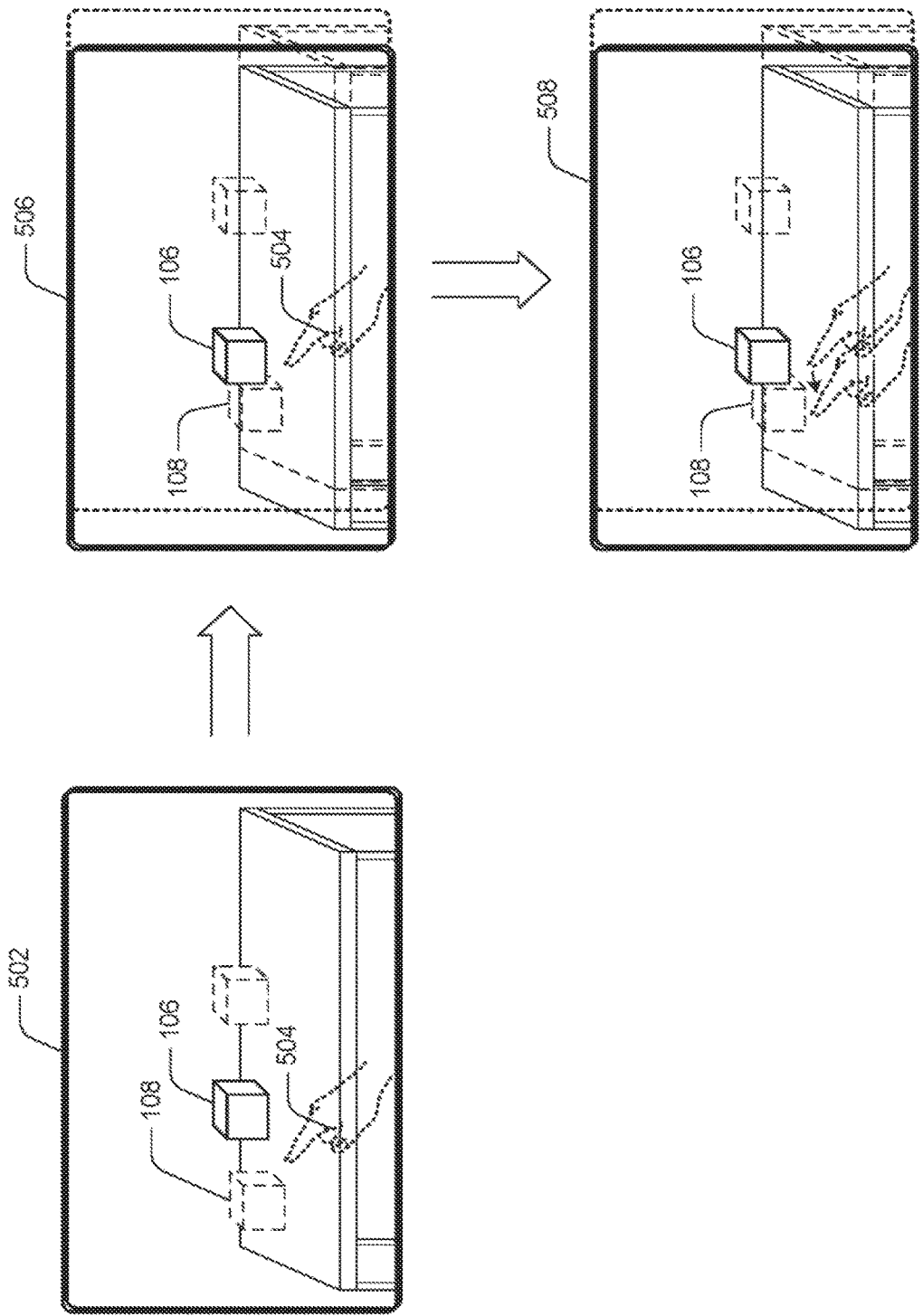
FIG. 5 is a pictorial diagram illustrating an example of a combination of world warping and body warping.

FIG. 5 illustrates an example of dynamic haptic retargeting using a combination of world warping and body warping. View 502 corresponds to view 208 of FIG. 2, which illustrates a virtual environment mapped onto a physical environment. Furthermore, view 502 includes a virtual representation of a user's hand 504, as the user reaches toward virtual object 108. As in the scenarios described above with reference to FIGS. 2 and 3, because physical object 106 and virtual object 108 are not aligned with one another, if the reaches for virtual object 108, the user will not physically come in contact with physical object 106. View 506 illustrates a result of a dynamic world warping which results in virtual object 108 being closer to physical object 106. View 508 illustrates a result of a dynamic body warping applied after the dynamic world warping shown in view 506. By applying a combination of world warping and body warping, each can be applied to a lesser degree than if only one is applied.

Example Haptic Retargeting System

Figure 6:
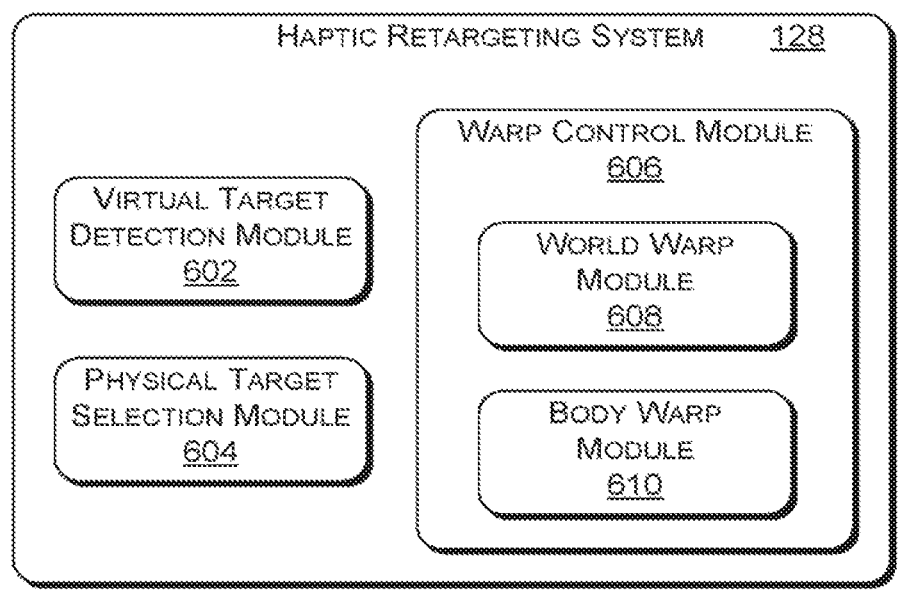
FIG. 6 is a block diagram illustrating select components of a haptic retargeting system.

FIG. 6 illustrates select components of an example haptic retargeting system 128, which includes virtual target detection module 602, physical target selection module 604, and warp control module 606. As described above with reference to FIG. 1, one or more individual components, or portions of individual components, of the haptic retargeting system 128 can be implemented as part of device 112 and/or server 132, or any other device communicatively connected to device 112.

Target detection module 602 determines a virtual object toward which a user is reaching. Any number of techniques may be used to detect the target virtual object. For example, a user may indicate the target via a user interface selection or via a voice command. As another example, device 112 may include sensors to facilitate gaze detection, and a target virtual object may be detected based on a determined gaze direction. As another example, a vector may be generated based on a user's reach, and a virtual object nearest an intersection with the vector may be detected as the target virtual object.

Physical target selection module 604 selects a physical object to be mapped to the detected target virtual object. Any number of techniques may be used to select the target physical object. As an example, if multiple physical objects are in the physical environment, the physical object closest to the target virtual object may be selected. As another example, if multiple physical objects are in the physical environment, a physical object that most closely resembles the target virtual object mat by selected. In another example, the closest physical object that resembles the target virtual object may be selected as the target physical object. In yet another example, any of the above criteria may be used in conjunction with determining a physical object for which a path between the user's physical hand and the physical object does not intersect any other physical or virtual objects.

Warp control module 606 controls the application of world warp and/or body warp to facilitate dynamic haptic retargeting. Warp control module 606 includes world warp module 608 and body warp module 610. World warp module 608 dynamically applies world warping to incrementally alter the alignment of the virtual environment with the physical environment as a user reaches toward a virtual object. Body warp module 610 dynamically applies body warping to incrementally modify the location of the virtual representation of the user's hand as the user reaches toward the virtual object.

Methods for Dynamic Haptic Retargeting

FIGS. 7-12 illustrate example methods for performing dynamic haptic retargeting. The example processes are illustrated as collections of blocks in logical flow graphs, which represent sequences of operations that can be implemented in hardware, software, or a combination thereof. The blocks are referenced by numbers. In the context of software, the blocks represent computer-executable instructions stored on one or more computer-readable media that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 7:
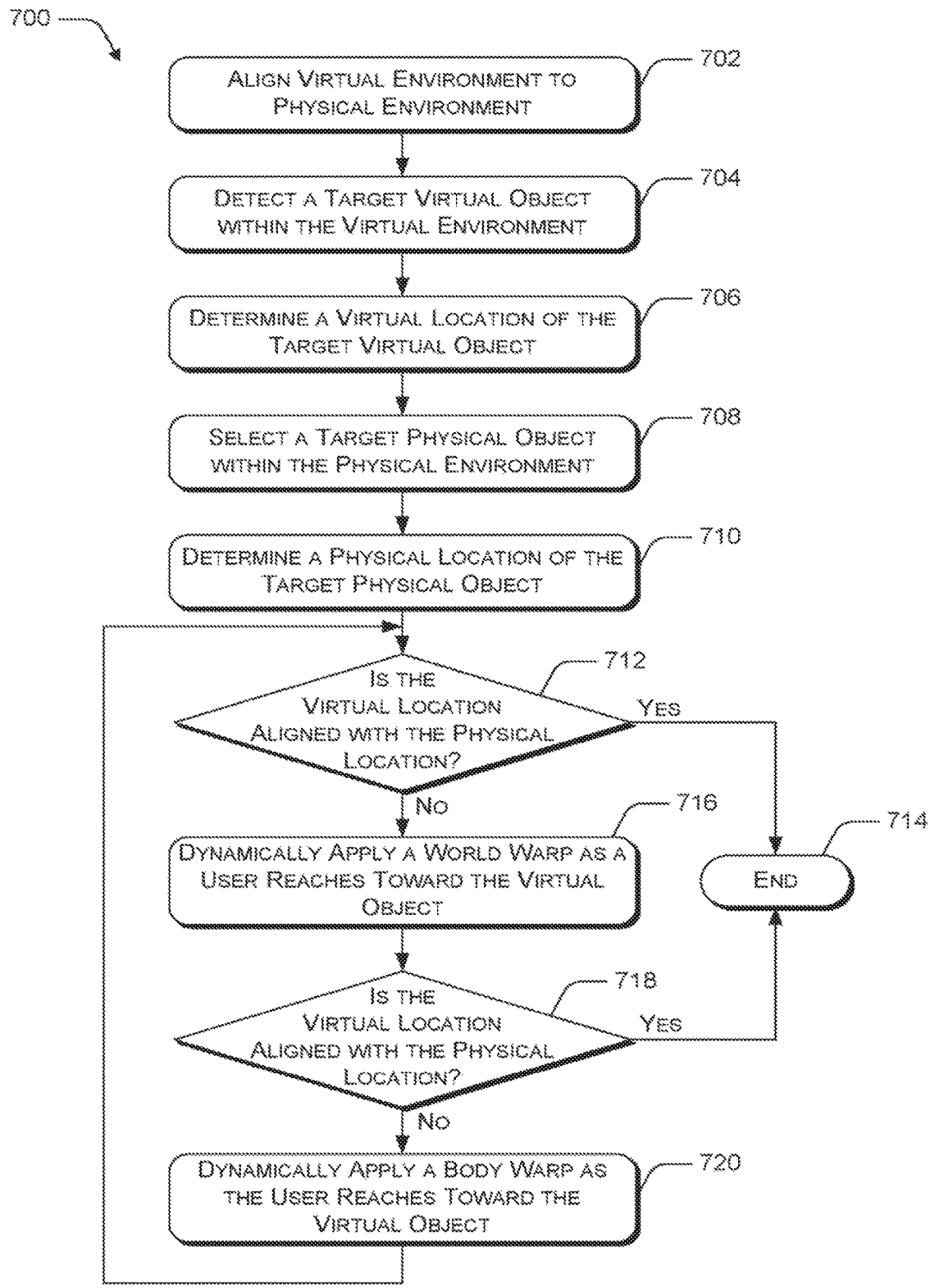
FIG. 7 is a flow diagram of an example method for performing dynamic haptic retargeting.

FIG. 7 illustrates an example method 700 for performing dynamic haptic retargeting. At block 702, a virtual environment is aligned with a physical environment. For example, as described above with reference to FIGS. 1 and 2, virtual reality system 125 aligns virtual environment 202 with physical environment 204.

At block 704, a target virtual object is detected within the virtual environment. For example, virtual target detection module 602 detects a virtual object that is a target of a user's reach. For example, as described above with reference to FIG. 6, virtual target detection module may use any number of techniques to detect the target virtual object, including, but not limited to, user selection through a user interface or voice command, gaze detection, or analysis of motion of the user's hand.

At block 706, a virtual location of the target virtual object is determined. For example, virtual reality system 125 tracks the location of each virtual object.

At block 708, a target physical object is selected within the physical environment. For example, physical target selection module 604 selects a physical object to be mapped to the target virtual object. For example, as described above with reference to FIG. 6, any number of techniques may be used to select the target physical object. For example, if multiple physical objects are candidates, a physical object closest to the target virtual object may be selected, a physical object that most closely resembles the target virtual object may be selected, or a physical object having a texture represented by the target virtual object may be selected.

At block 710, a physical location of the target physical object is determined. For example, virtual reality system 126 may be configured to maintain location data associated with each physical object in the physical environment to which the virtual environment is mapped.

At block 712, it is determined whether or not the virtual location of the target virtual object is aligned with the physical location of the target physical object. For example, warp control module 606 compares a location of the target virtual object with a location of the target physical object. If the locations are within a threshold distance of one another, then it is determined that the target virtual object and the target physical object are aligned.

If the virtual location of the target virtual object is aligned with the physical location of the target physical object (the "Yes" branch from block 712), then at block 714, the method ends as there is no need to perform a world warp or a body warp.

On the other hand, if the virtual location of the target virtual object is not aligned with the physical location of the target physical object (the "No" branch from block 712), then at block 716, a world warp is dynamically applied as the user reaches toward the virtual object.

At block 718, warp control module 606 determines whether or not the virtual location of the target virtual object is aligned with the physical location of the target physical object. For example, warp control module 606 compares a location of the target virtual object (after the world warp has been applied) with a location of the target physical object. If the locations are within a threshold distance of one another, then it is determined that the target virtual object and the target physical object are aligned.

If the virtual location of the target virtual object is aligned with the physical location of the target physical object (the "Yes" branch from block 718), then at block 714, the method ends as there is no need to perform a body warp or an additional world warp.

On the other hand, if the virtual location of the target virtual object is not aligned with the physical location of the target physical object (the "No" branch from block 718), then at block 720, a body warp is dynamically applied as the user reaches toward the virtual object.

Processing continues as described above with reference to block 712. In an example implementation, blocks 712-720 are performed repeatedly as a user reaches toward the target virtual object. These steps may be performed periodically based on a pre-defined time interval. For example, the steps represented by blocks 712-720 may be performed for each frame of data captured by a sensor 120.

Figure 8:
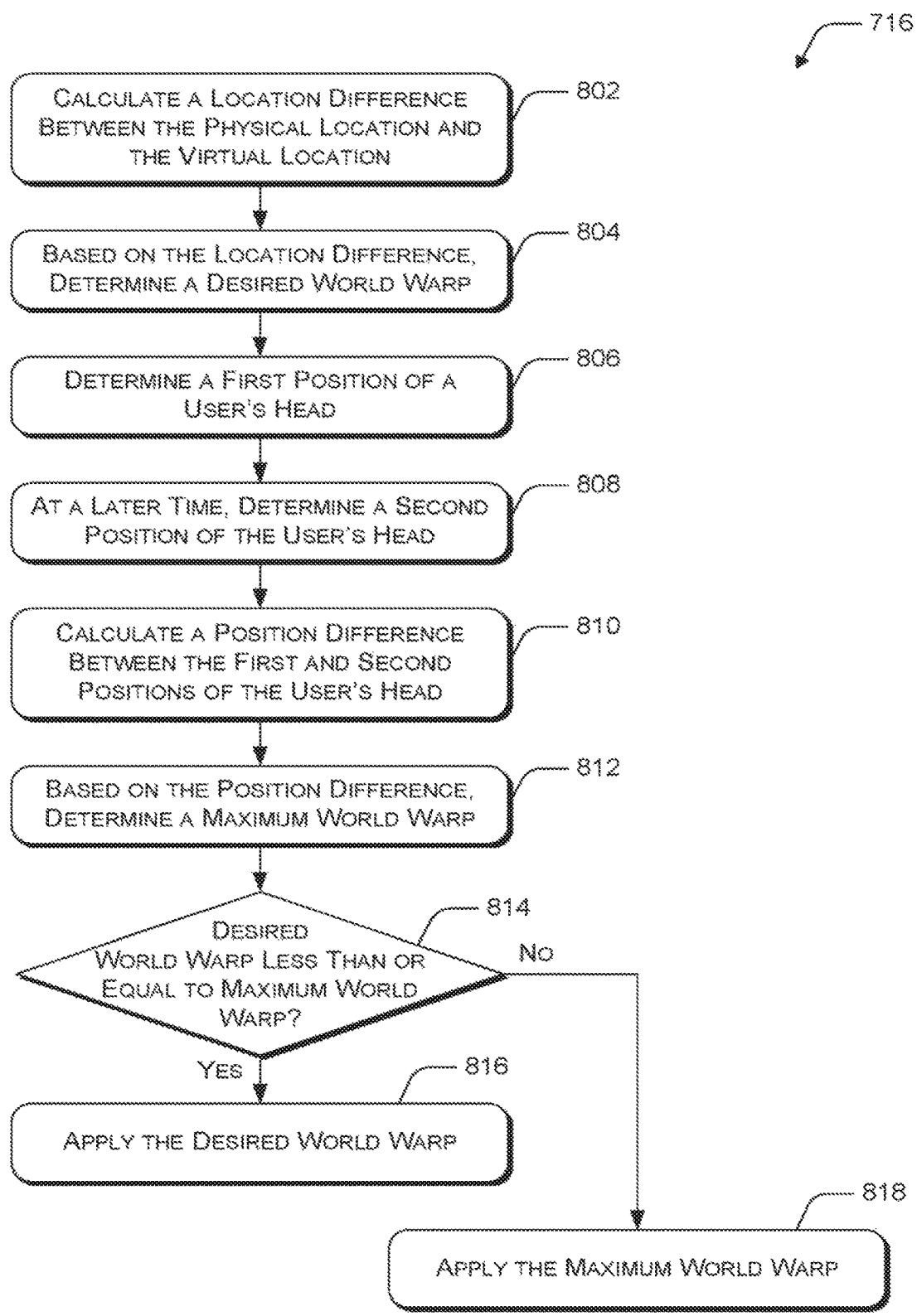
FIG. 8 is a flow diagram of an example method for applying a world warp to perform dynamic haptic retargeting.

FIG. 8 illustrates an example method 716 for dynamically applying a world warp as the user reaches toward a virtual object. At block 802, a location difference between the physical location of the target physical object and the virtual location of the target virtual object is calculated. For example, virtual reality system 126 maintains location data for the target virtual object and the target physical object. In an example implementation, world warp module calculates a difference between the location of the target virtual object and the location of the target physical object. The difference may be represented as a vector, as a degree of rotation, or as a combination of a degree of rotation and a vector, which, when applied to the virtual environment with respect to the physical environment, would result in the target virtual object being aligned with the target physical object.

At block 804, a desired world warp is determined based on the location difference. For example, if the location difference is represented as a degree of rotation, a desired world warp is determined to be equal to the location difference. In other words, the desired world warp is a world warp that, if applied to the virtual environment with respect to the physical environment, would result in the target virtual object being aligned with the physical object.

However, as is well known in the art, applying an excessive world warp may be visibly detectable by the user and/or may cause feelings of motion sickness for the user. Previous research has shown that as a user moves his head, translations and/or rotations may be applied to the virtual environment, which are imperceptible or minimally imperceptible to the user. For example, if a user rotates his head 90 degrees to the right, rotating the virtual environment 10 degrees left or right may be imperceptible to the user. Accordingly, threshold factors based on changes in a user's head position (e.g., translation and/or rotation) can be applied to determine a maximum world warp that is likely to be imperceptible to the user. The threshold factors may differ for translation as compared to rotation. Furthermore, the threshold factors may not be symmetric. That is, when a user rotates his head to the right, the threshold for applying a right rotational world warp may be greater than a threshold for applying a left rotational world warp. Similarly, thresholds for applying vertical translations or rotations may differ from thresholds for applying horizontal translations or rotations.

At block 806, a first position of a user's head is determined. For example, based on data received from camera 114 and/or sensors 120, a position of the user's head at a first instant in time is determined.

At block 808, at a later time, a second position of a user's head is determined. For example, based on data received from camera 114 and/or sensors 120, a position of the user's head at a second, later instant in time is determined. In an example, the difference between the first instant in time and second instant in time is a fraction of a second.

At block 810, a position difference between the first and second positions of the user's head is calculated. For example, world warp module 608 compares the first position of the user's head with the second position of the user's head. The position difference may represent any one or more of a horizontal translation, a vertical translation, a horizontal rotation, or a vertical rotation. In an example implementation, the calculated position difference is a single value that represents a three-dimensional position difference. In another example, the calculated position difference may have multiple components representing, for example, a horizontal translation, a vertical translation, a horizontal rotation, or a vertical rotation.

At block 812, a maximum world warp is determined based on the calculated position difference. For example, world warp module 608 applies a threshold warp factor to the calculated position difference to determine the maximum world warp. In an example implementation, the maximum world warp may be represented as a single value that represents a position change in three-dimensional space. In another example implementation, the maximum world warp may be a combination of multiple values. For example, a first maximum warp value may be based on a horizontal translation of the user's head, a second maximum warp value may be based on a horizontal rotation of the user's head, and a third maximum warp value may be based on a vertical rotation of the user's head.

At block 814, it is determined whether or not the desired world warp is less than or equal to the maximum world warp. For example, as described above, the maximum world warp represents a degree to which the virtual environment can be warped while likely being imperceptible to the user. At block 814, it is determined whether or not applying a world warp sufficient to align the target virtual object with the target physical object is within the threshold maximum world warp.

If the desired world warp is less than or equal to the maximum world warp (the "Yes" branch from block 814), then at block 816, the desired world warp is applied. For example, world warp module 608 rotates and/or translates the virtual environment with respect to the physical environment based on the previously calculated desired world warp, resulting in alignment of the target virtual object and the target physical object.

On the other hand, if the desired world warp is greater than the maximum world warp (the "No" branch from block 814), then at block 818, the maximum world warp is applied. For example, if it is determined that the world warp necessary to align the target virtual object with the target physical object would likely be perceptible to the user, then maximum world warp (that is likely to be imperceptible to the user) is applied. For example, world warp module 608 rotates and/or translates the virtual environment with respect to the physical environment based on the previously calculated maximum world warp. As a result, a location difference between the target virtual object and the target physical object will be less than before the world warp, but the target virtual object and the target physical object will still not be aligned.

Figure 9:
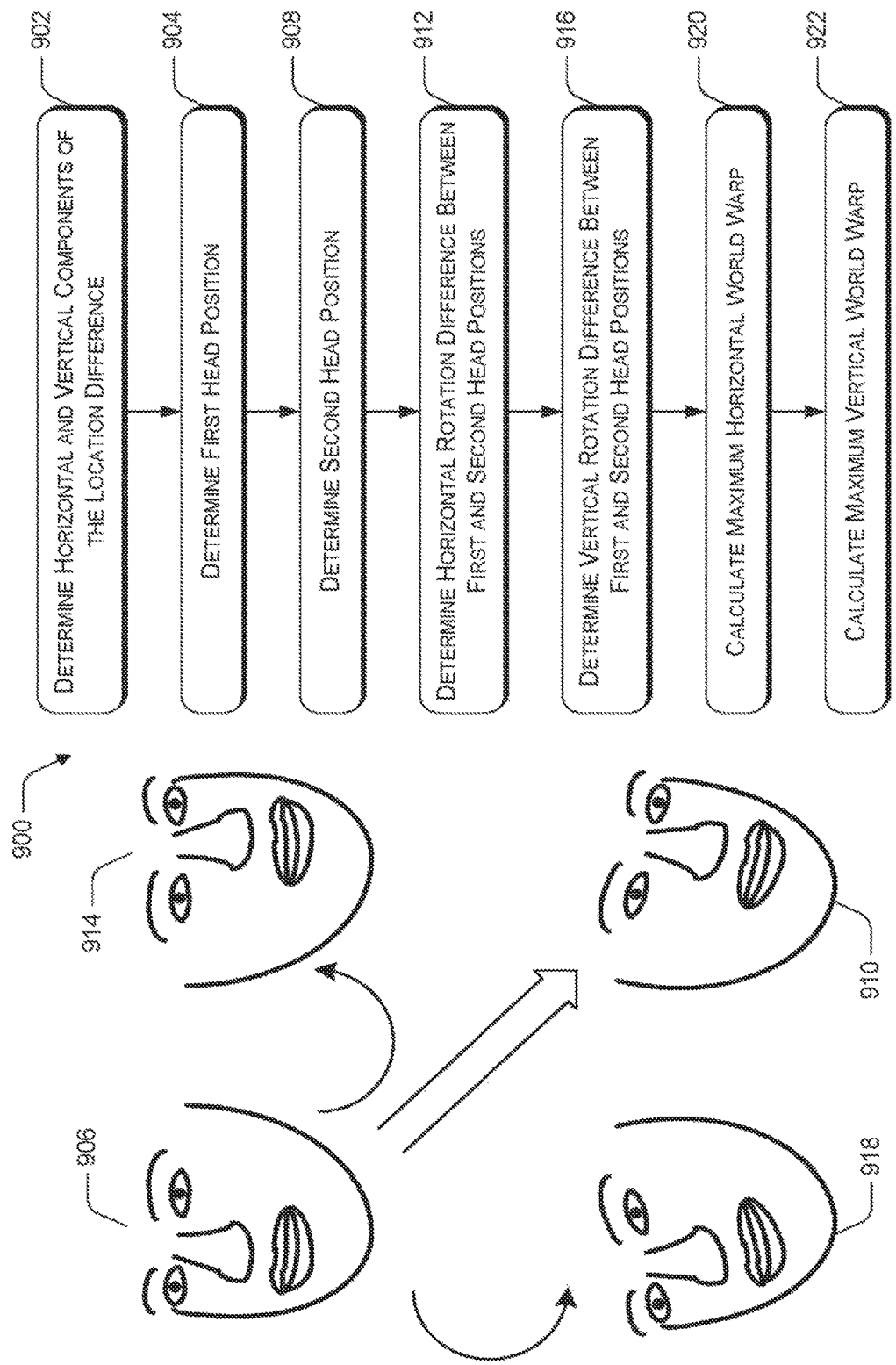
FIG. 9 is a flow diagram of an example method for determining a maximum world warp based on a change in a user's head position.

FIG. 9 illustrates an example method 900 for calculating a maximum world warp based on horizontal and vertical head rotation. At block 902, horizontal and vertical components of the location difference are determined. For example, if both the virtual object and the physical object are resting on a same surface, the horizontal component of the location difference represents the distance between the virtual object and physical object along the plane of the table surface. If the virtual object is, for example, stacked on another virtual object, and the vertical component of the location difference represents the vertical distance between the virtual object and the physical object. If both the virtual object and the physical object are resting on a same surface, the vertical component of the location difference is zero.

At block 904, a first head position is determined. For example, a first head position is represented by face 906. Block 904 may correspond to block 806 in FIG. 8.

At block 908, a second head position is determined. For example, a second head position is represented by face 910. Block 908 may correspond to block 808 in FIG. 8.

At block 912, a horizontal rotation difference between the first and second head positions is determined. For example, the difference between face 906 and face 914 represents the horizontal rotation difference, which is attributed to left/right head rotation.

At block 916, a vertical rotation difference between the first and second head positions is determined. For example, the difference between face 906 and face 918 represents the vertical rotation difference, which is attributed to up/down head nodding.

Blocks 912 and 916 may correspond to block 810 in FIG. 8.

At block 920, a maximum horizontal world warp is calculated. For example, world warp module 608 determines a degree of horizontal rotation represented by the difference between the first and second head positions. A maximum world warp scaling factor is then applied to the degree of horizontal rotation to calculate the maximum horizontal world warp. As described above, based on a horizontal head rotation, two values may be calculated for the maximum world warp (i.e., one for a right rotational warp and one for a left rotational warp). For example, if the user's head rotated toward the right, a first maximum horizontal world warp may be calculated that would allow for the virtual environment to be rotated 49% further to the right and a second maximum horizontal world warp may be calculated that would allow for the virtual environment to be rotated 20% less (effectively rotating the virtual environment to the left).

At block 922, a maximum vertical world warp is calculated. For example, world warp module 608 determines a degree of vertical rotation represented by the difference between the first and second head positions. A maximum world warp scaling factor is then applied to the degree of vertical rotation to calculate the maximum vertical world warp. As described above, based on a vertical head rotation, two values may be calculated for the maximum world warp (i.e., one for an upward rotational warp and one for a downward rotational warp).

Blocks 920 and 922 may correspond to block 812 in FIG. 8.

Figure 10:
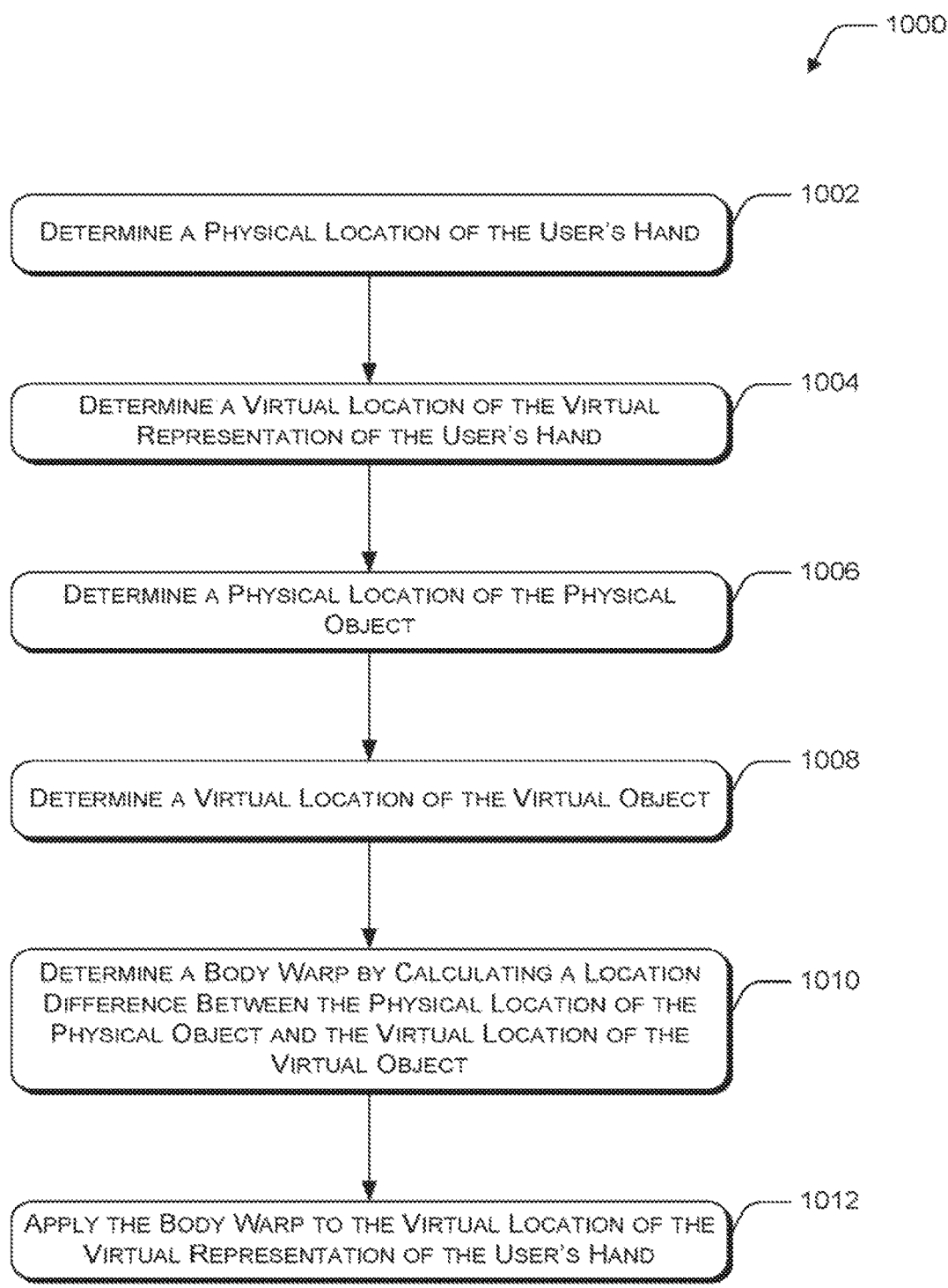
FIG. 10 is a flow diagram of an example method for applying a body warp to perform dynamic haptic retargeting.

FIG. 10 illustrates an example method 1000 for dynamically applying a body warp as a user reaches for a virtual object. At block 10002, a physical location of the user's hand is determined. For example, virtual reality system 126 may track a physical location of the user's hand based on hand tracking device 116 and/or data from camera 114.

At block 1004, a virtual location of the virtual representation of the user's hand is determined. For example, virtual reality system 126 maintains data representing the current location of the virtual representation of the user's hand.

At block 1006, a physical location of the physical object is determined. For example, physical target selection module 604 selects and identifies the target physical object 106 to which the virtual object 108 the user is reaching for is mapped. The physical location of the physical object may be tracked, for example, by virtual reality system 126

At block 1008, a virtual location of the virtual object is determined. For example, virtual reality system 126 maintains location data corresponding to the virtual location of the virtual object 108 that the user is reaching for.

At block 1010, a body warp is determined by calculating a location difference between the physical location of the physical object and the virtual location of the virtual object. For example, body warp module 610 calculates a difference between the physical location of the physical object 106 and the virtual location of the virtual object 108.

At block 1012, the body warp is applied to the virtual representation of the user's hand. For example, body warp module 610 translates the virtual representation of the user's hand within the virtual environment, such that a vector describing a path between the physical location of the user's physical hand and the physical location of the physical object has the same distance and direction as a vector describing a path between the translated virtual location of the virtual representation of the user's hand and the virtual location of the virtual object.

Figure 11:
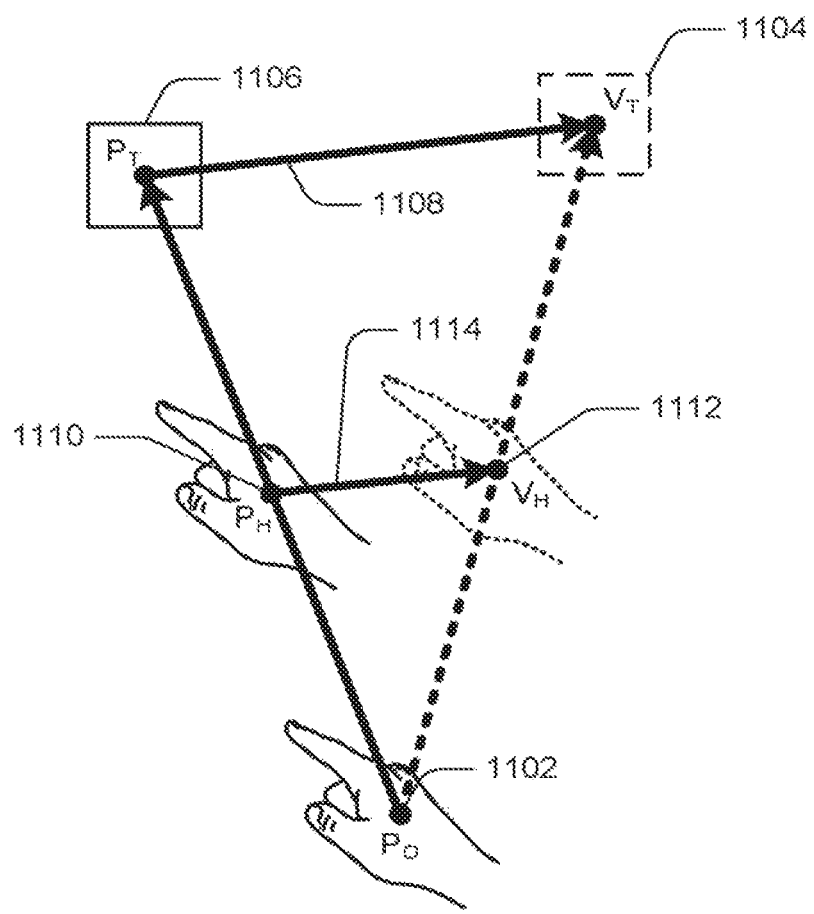
FIG. 11 is a pictorial diagram illustrating an example incremental body warp.

FIG. 11 illustrates an example incremental body warp. According to the technique described with reference to FIG. 10, a body warp is applied initially, when the user first begins to reach for a virtual object. In contrast, FIG. 11 illustrates a scenario in which the body warp is applied incrementally such that as the user's hand gets closer to the target of the reach, a greater body warp is applied.

For example, as illustrated in FIG. 11, $P_O$ represents an initial position 1102 of the user's physical hand when the user starts to reach for the virtual object 1104. $V_T$ represents the virtual location of the virtual object 1104. $P_T$ represents the physical location of a physical object 1106, which is mapped to the virtual object 1104. Vector 1108, between the physical location of the physical object 1106 and the virtual location of the virtual object 1104, represents the total body warp to be applied to ensure that when the virtual representation of the user's hand reaches the virtual object, the user's physical hand reaches the physical object.

$P_H$ represents a current location 1110 of the user's physical hand and $V_H$ represents a corresponding current location 1112 of the virtual representation of the user's hand as the user is reaching for the virtual object 1104. Vector 1114, between the current location of the user's hand the current location of the virtual representation of the user's hand, represents an incremental warp to be applied at the current time, based on the current locations 1110 and 1112.

Figure 12:
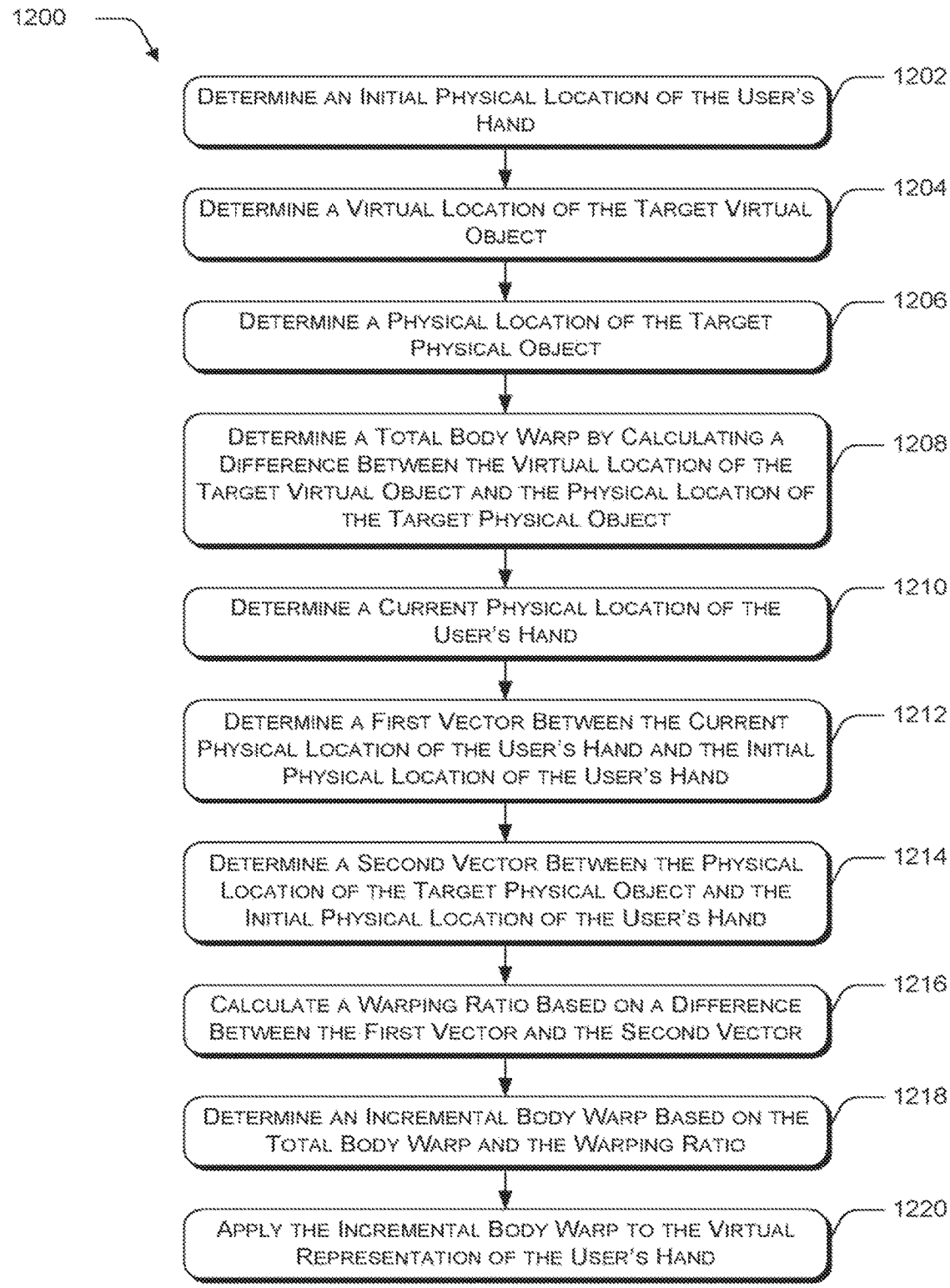
FIG. 12 is a flow diagram of an example method for applying an incremental body warp.

FIG. 12 illustrates an example method 1200 for dynamically applying an incremental body warp as a user reaches for a virtual object. The method illustrated in FIG. 12 may correspond to block 720 of FIG. 7.

At block 1202, an initial physical location of the user's hand is determined. For example, as illustrated in, and described above with reference to FIG. 11, the initial hand position may be indicated as $P_O$ 1102 as the user begins reaching for the virtual object. As illustrated in, and described above with reference to, FIG. 7, steps 712-720 are repeated as a user reaches for a virtual object. In an example implementation, $P_O$ is determined to be the location of the user's physical hand the first time step 720 is performed for a particular target virtual object. The initial physical location of the user's hand may be tracked by, for example, virtual reality system 126, and maintained by body warp module 610.

At block 1204, a virtual location of the target virtual object is determined. For example, virtual reality system 126 may maintain location information associated with the virtual object. As illustrated in FIG. 11, the virtual location of the target virtual object may be represented as V$_T$ 1104.

At block 1206, a physical location of the target physical object is determined. For example, physical target selection module 604 selects and identifies the target physical object 1106 to which the target virtual object 1104 the user is reaching for is mapped. The body warp module 610 determines the location, P$_T$, based, for example, on location data maintained by virtual reality system 126.

At block 1208, a total body warp is determined. For example, body warp module 610 calculates a difference between the virtual location, V$_T$, of the target virtual object 1104 and the physical location, P$_T$, of the target physical object 1106.

At block 1210, a current physical location of the user's hand is determined. For example, as described above with reference to block 1202, an incremental body warp may be applied multiple times as a user reaches for a virtual object. Accordingly, the first time the body warp is applied, the current physical location of the user's hand, P$_H$, is equal to the initial physical location of the user's hand, P$_O$. However, as the user moves their hand, P$_O$ remains constant, while P$_H$ changes to reflect the current position of the user's hand 1110.

At block 1212, a first vector is determined between the current physical location of the user's hand and the initial physical location of the user's hand. For example, referring to FIG. 11, body warp module 610 determines a direction and distance between P$_H$ and P$_O$.

At block 1214, a second vector is determined between the physical location of the target physical object and the initial physical location of the user's hand. For example, referring to FIG. 11, body warp module 610 determines a direction and distance between P$_T$ and P$_O$.

At block 1216, a warping ratio is calculated based on a difference between the first vector and the second vector. For example, body warp module 610 calculates a warping ratio, α, such that:

$$\alpha = \max\left(0, \min\left(1, \frac{(P_T - P_O) \cdot (P_H - P_O)}{(P_T - P_O)^2}\right)\right)$$

At block 1218, an incremental body warp is determined based on the total body warp (see block 1208) and the warping ratio. For example, body warp module 610 may multiply the total body warp by the warping ratio to calculate the incremental body warp.

At block 1220, the incremental body warp is applied to the virtual representation of the user's hand. For example, the virtual position of the virtual representation of the user's hand 1112, is translated by the incremental body warp value.

Figure 13:
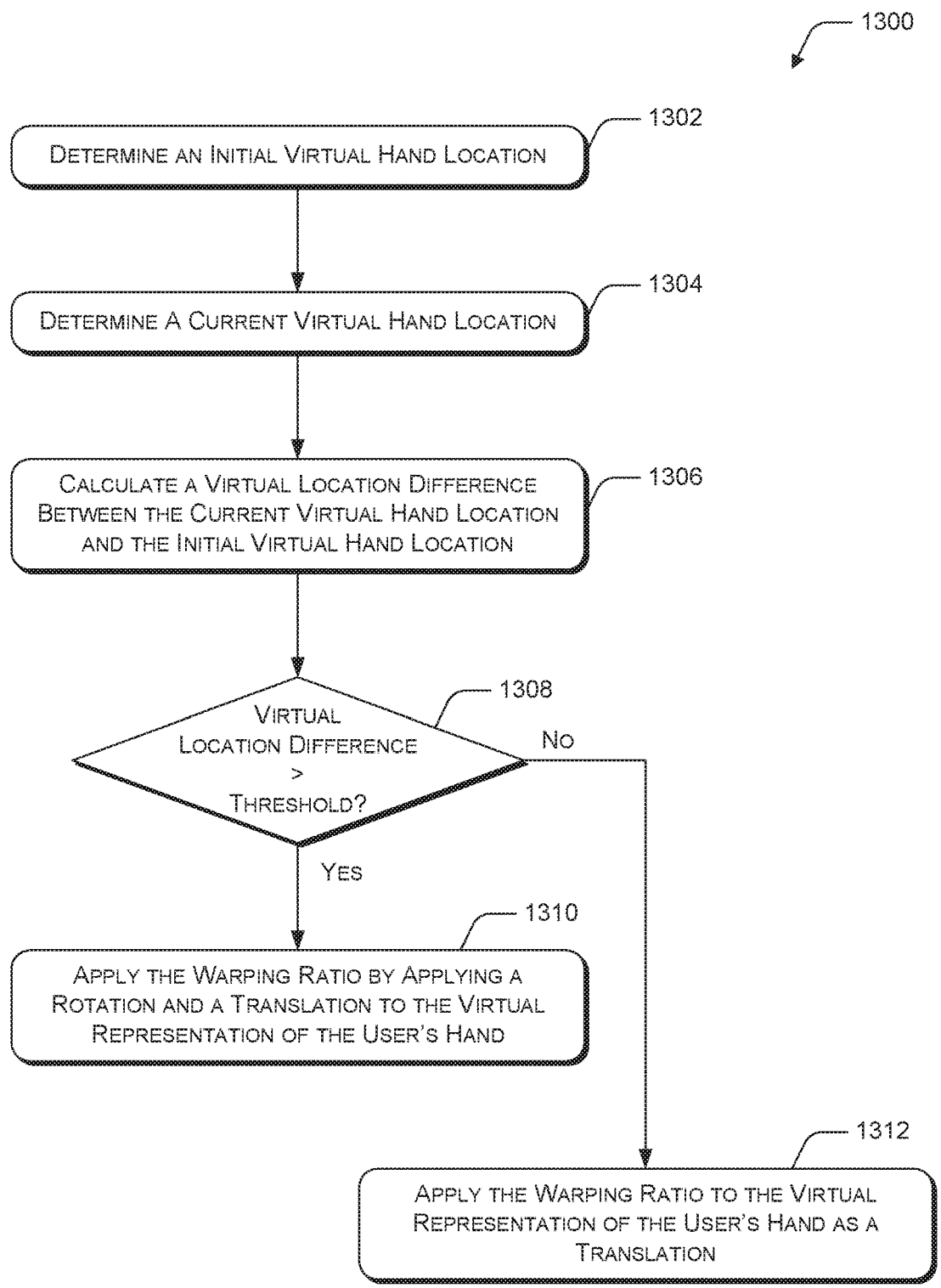
FIG. 13 is a flow diagram of an example method for applying a body-friendly body warp.

FIG. 13 illustrates an example method 1300 for applying a body-friendly body warp. As described above with reference to FIG. 4, translating the virtual representation of the user's hand can result in a virtual representation of a hand that appears to be disconnect from the body or otherwise misaligned with the body. Method 1300 utilizes a rotational adjustment to maintain a more realistic alignment with between the virtual representation of the user's hand and the user's body.

At block 1302, an initial virtual hand location is determined. For example, body warp module 610 determines a location of the virtual representation of the user's hand when the user began reaching for the target virtual object. In an example implementation, this value may remain constant as multiple body warps are applied over time.

At block 1304, a current virtual hand location is determined. For example, body warp module 610 determines a current location of the virtual representation of the user's hand. In an example implementation, as the user reaches for a target virtual object, the location of the virtual representation of the user's hand changes.

At block 1306, a virtual location difference is calculated as a difference between the initial virtual hand location and the current virtual hand location. For example, body warp module 610 determines a vector that represents a direction and a distance between the initial virtual hand location and the current virtual hand location.

At block 1308, it is determined whether or not the virtual location difference is greater than a threshold value. For example, a tolerable amount of misalignment between the user's body and the virtual representation of the user's hand may be represented by the threshold value. In an example implementation, the threshold value may include a direction component and a distance component. For example, a greater distance threshold may be tolerable in conjunction with a smaller angle difference.

If the virtual location difference is greater than the threshold (the "Yes" branch from block 1308), then at block 1310, the warping ratio is applied by applying a translation and a rotation to the virtual representation of the user's hand. For example, body warp module 610 may translate the virtual representation of the user's hand, and then rotate the virtual representation of the user's hand about a point coinciding with the user's wrist, to better align the portion of the virtual representation of the user's hand that is closest to the user's body.

On the other hand, if the virtual location difference is not greater than the threshold (the "No" branch from block 1308), then at block 1312, the warping ratio is applied by applying a translation to the virtual representation of the user's hand.

Example Clauses

A. A method comprising: mapping a virtual environment to a physical environment to establish an alignment between the virtual environment and the physical environment; determining, within the physical environment, a physical location of a physical object; determining, within the virtual environment, a virtual location of a virtual object; determining that a user is reaching toward the virtual object; rendering within the virtual environment, a virtual hand that represents at least a portion of the user's hand while the user is reaching toward the virtual object; and based at least in part on a difference between the physical location and the virtual location: dynamically adjusting the alignment between the virtual environment and the physical environment to reduce the difference between the physical location and the virtual location; and dynamically adjusting the virtual representation of the user's hand to cause the user to physically reach for the physical object while it appears that the virtual representation of the user's hand is reaching for the virtual object.

B. A method as Paragraph A recites, further comprising: determining a first position of the user's head while the user is reaching toward the virtual object; determining a second position of the user's head while the user is reaching toward the virtual object; calculating a difference between the first position of the user's head and the second position of the user's head, wherein the difference indicates a vertical rotation; and dynamically adjusting the alignment between the virtual environment and the physical environment to reduce a vertical distance between the physical location and the virtual location.

C. A method as Paragraph A or Paragraph B recites, further comprising: determining a location of the user's physical hand and a corresponding location of the virtual hand while the user is reaching toward the virtual object; determining a virtual vector that represents a distance and direction between the location of the virtual hand and the virtual location of the virtual object; determining a physical vector that represents a distance and direction between the location of the user's physical hand and the physical location of the physical object; and based at least in part on a difference between the virtual vector and the physical vector, dynamically applying a body warping to adjust the location of the virtual hand within the virtual environment.

D. A method as Paragraph C recites, wherein applying the body warping comprises: calculating a warping ratio based on the physical location of the physical object, an initial location of the user's physical hand, and a current location of the user's physical hand; and adjusting the location of the virtual hand within the virtual environment based, at least in part, on the warping ratio.

E. A method as Paragraph C or Paragraph D recites, wherein applying the body warping comprises: applying a translation to the virtual hand to adjust the location of the virtual hand within the virtual environment; and applying a rotation to the virtual hand.

F. A method as any of Paragraphs A-E recite, further comprising: repeatedly applying a world warping as the user reaches toward the virtual object.

G. A method as any of Paragraphs A-F recite, further comprising: repeatedly applying a body warping as the user reaches toward the virtual object such that a position of the virtual hand intersects with the virtual location at substantially the same time that a position of the user's physical hand intersects with the physical location.

H. A method comprising: mapping a virtual environment to a physical environment to establish an alignment between the virtual environment and the physical environment; determining, within the physical environment, a physical location of a physical object and a physical location of a user's physical hand; determining, within the virtual environment, a virtual location of a virtual object and a virtual location of a virtual representation of the user's hand; determining that a user is reaching toward the virtual object; determining that the virtual object and the physical object are not aligned, so that, based on a current trajectory, when the virtual representation of the user's hand reaches the virtual object, the user's physical hand will not reach the physical object; and dynamically adjusting the virtual location of the virtual representation of the user's hand to reduce a difference between a vector between the physical location of the physical object and the physical location of the user's physical hand and a vector between the virtual location of the virtual object and the virtual location of the virtual representation of the user's hand.

I. A method as Paragraph H recites, further comprising: repeatedly adjusting the virtual location of the virtual representation of the user's hand as the user reaches toward the virtual object such that the virtual location of the virtual representation of the user's hand intersects with the virtual location of the virtual object at substantially the same time that the physical location the user's hand intersects with the physical location of the physical object.

J. A method as Paragraph H or Paragraph I recites, wherein dynamically adjusting the virtual location of the virtual representation of the user's hand comprises:
applying a translation to the virtual representation of the user's hand to adjust the virtual location of the virtual representation of the user's hand within the virtual environment; and
applying a rotation to the virtual representation of the user's hand.

K. A method as any of Paragraphs H-J recite, wherein dynamically adjusting the virtual location of the virtual representation of the user's hand comprises:
calculating a warping ratio based on the physical location of the physical object, an initial physical location of the user's hand, and a current physical location of the user's hand; and
adjusting the virtual location of the virtual hand within the virtual environment based, at least in part, on the warping ratio.

L. A method as Paragraph K recites, further comprising: repeatedly calculating a warping ratio and adjusting the virtual location of the virtual representation of the user's hand based, at least in part, on the warping ratio as the user reaches toward the virtual object such that the virtual location of the virtual representation of the user's hand intersects with the virtual location of the virtual object at substantially the same time that the physical location the user's hand intersects with the physical location of the physical object.

M. One or more computer readable media having computer-executable instructions stored thereon, which, when executed by a computing device, cause the computing device to perform operations comprising: mapping a virtual environment to a physical environment to establish an alignment between the virtual environment and the physical environment; determining, within the physical environment, a physical location of a physical object; determining, within the virtual environment, a virtual location of a virtual object; determining that a user is reaching toward the virtual object; dynamically adjusting the alignment between the virtual environment and the physical environment to reduce a difference between the physical location of the physical object and the virtual location of the virtual object; and dynamically adjusting a virtual location of a virtual representation of the user's hand to increase a likelihood that a physical hand of the user will reach the physical location of the physical object at substantially the same time that a virtual representation of the user's hand will reach the virtual location of the virtual object.

N. One or more computer readable media as Paragraph M recites, wherein dynamically adjusting a virtual location of a virtual representation of the user's hand to increase a likelihood that a physical hand of the user will reach the physical location of the physical object at substantially the same time that a virtual representation of the user's hand will reach the virtual location of the virtual object includes: dynamically adjusting a virtual location of a virtual representation of the user's hand to reduce a difference between a vector between the physical location of the physical object and a physical location of the user's physical hand and a vector between the virtual location of the virtual object and a virtual location of the virtual representation of the user's hand.

O. One or more computer readable media as Paragraph M or Paragraph N recites, wherein dynamically adjusting a virtual location of a virtual representation of the user's hand comprises: translating the virtual representation of the user's hand within the virtual environment; and rotating the virtual representation of the user's hand within the virtual environment.

P. One or more computer-readable media as any of Paragraphs M-O recite, wherein dynamically adjusting the alignment between the virtual environment and the physical environment to reduce a difference between the physical location of the physical object and the virtual location of the virtual object comprises: determining a change in a position of the user's head; and dynamically adjusting the alignment between the virtual environment and the physical environment based, at least in part, on the determined change in the position of the user's head.

Q. One or more computer-readable media as Paragraph P recites, wherein dynamically adjusting the alignment between the virtual environment and the physical environment to reduce a difference between the physical location of the physical object and the virtual location of the virtual object further comprises: calculating distance between the physical location of the physical object and the virtual location of the virtual object; and dynamically adjusting the alignment between the virtual environment and the physical environment further based, at least in part, on the distance between the physical location of the physical object and the virtual location of the virtual object.

R. One or more computer-readable media as any of Paragraphs M-Q recite, wherein dynamically adjusting the alignment between the virtual environment and the physical environment to reduce a difference between the physical location of the physical object and the virtual location of the virtual object comprises: determining a change in a position of the user's head; based, at least in part, on the change in the position of the user's head, calculating a maximum adjustment value; and adjusting the alignment between the virtual environment and the physical environment based, at least in part, on the maximum adjustment value.

S. One or more computer-readable media as Paragraph R recites, wherein dynamically adjusting the alignment between the virtual environment and the physical environment to reduce a difference between the physical location of the physical object and the virtual location of the virtual object further comprises: calculating a distance between the physical location of the physical object and the virtual location of the virtual object; and dynamically adjusting the alignment between the virtual environment and the physical environment further based, at least in part, on the distance between the physical location of the physical object and the virtual location of the virtual object.

T. One or more computer-readable media as any of Paragraphs M-Q recite, wherein dynamically adjusting the alignment between the virtual environment and the physical environment to reduce a difference between the physical location of the physical object and the virtual location of the virtual object comprises: calculating a vertical distance between the physical location of the physical object and the virtual location of the virtual object; determining a vertical rotation of the user's head; based on the vertical rotation of the user's head, calculating a maximum adjustment value; and dynamically adjusting a vertical alignment between the virtual environment and the physical environment based, at least in part on the maximum adjustment value and the vertical distance between the physical location of the physical object and the virtual location of the virtual object.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device 112 and/or server 130 such as one or more internal or external CPUs or GPUs, and/or one or more pieces of hardware logic such as FPGAs, DSPs, or other types of accelerators.

All of the methods and processes described above may be embodied in, and fully automated via, specialized computer hardware. Some or all of the methods may alternatively be embodied in software code modules executed by one or more general purpose computers or processors. The code modules may be stored in any type of computer-readable storage medium or other computer storage device.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X. Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   determining, within a physical environment, a physical location of a physical object;
   determining, within a virtual environment mapped to the physical environment, a virtual location of a virtual object;
   determining that a physical hand of a user is reaching toward the virtual object;
   rendering, within the virtual environment, a virtual hand that represents at least a portion of the physical hand of the user while the physical hand of the user is reaching toward the virtual object;
   dynamically adjusting the virtual hand to cause the user to physically reach for the physical object while it appears that the virtual hand is reaching for the virtual object, wherein dynamically adjusting the virtual hand includes dynamically applying a body warping to adjust a location of the virtual hand within the virtual environment, wherein applying the body warping includes:
   calculating a warping ratio based on the physical location of the physical object, an initial location of the physical hand of the user, and a current location of the physical hand of the user; and
   adjusting the location of the virtual hand within the virtual environment based, at least in part, on the warping ratio.

2. The method of claim 1, further comprising:
   mapping the virtual environment to the physical environment to establish an alignment between the virtual environment and the physical environment.

3. The method of claim 1, further comprising:
   dynamically adjusting the alignment between the virtual environment and the physical environment to reduce the difference between the physical location and the virtual location.

4. The method of claim 1, wherein dynamically adjusting the virtual hand to cause the user to physically reach for the physical object is based, at least in part, on a difference between the physical location of the physical object and the virtual location of the virtual object.

5. The method of claim 1, wherein dynamically applying the body warping to adjust the location of the virtual hand within the virtual environment further comprises:
   determining a virtual vector that represents a distance and direction between the location of the virtual hand and the virtual location of the virtual object;
   determining a physical vector that represents a distance and direction between the current location of the physical hand of the user and the physical location of the physical object; and
   dynamically applying the body warping to adjust the location of the virtual hand within the virtual environment based at least in part on a difference between the virtual vector and the physical vector.

6. The method of claim 1, wherein applying the body warping comprises further comprises:
   applying a translation to the virtual hand to adjust the location of the virtual hand within the virtual environment; and
   applying a rotation to the virtual hand.

7. The method of claim 1, further comprising:
   repeatedly applying a body warping as the physical hand of the user reaches toward the virtual object such that the location of the virtual hand intersects with the virtual location of the virtual object at substantially the same time that a current location of the physical hand of the user intersects with the physical location of the physical object.

8. A non-transitory machine-readable medium storing instructions which, when executed by one or more machines, cause the one or more machines to perform operations comprising:
   determining, within a physical environment, a physical location of a physical object;
   determining, within a virtual environment mapped to the physical environment, a virtual location of a virtual object;
   determining that a physical hand of a user is reaching toward the virtual object;
   rendering, within the virtual environment, a virtual hand that represents at least a portion of the physical hand of the user while the physical hand of the user is reaching toward the virtual object;
   dynamically adjusting the virtual hand to cause the user to physically reach for the physical object while it appears that the virtual hand is reaching for the virtual object, wherein dynamically adjusting the virtual hand includes dynamically applying a body warping to adjust a location of the virtual hand within the virtual environment, wherein applying the body warping includes:
   calculating a warping ratio based on the physical location of the physical object, an initial location of the physical hand of the user, and a current location of the physical hand of the user; and
   adjusting the location of the virtual hand within the virtual environment based, at least in part, on the warping ratio.

9. The machine-readable medium of claim 8, the operations further comprising:
   mapping the virtual environment to the physical environment to establish an alignment between the virtual environment and the physical environment.

10. The machine-readable medium of claim 8, the operations further comprising:
    dynamically adjusting the alignment between the virtual environment and the physical environment to reduce the difference between the physical location and the virtual location.

11. The machine-readable medium of claim 8, wherein dynamically adjusting the virtual hand to cause the user to physically reach for the physical object is based, at least in part, on a difference between the physical location of the physical object and the virtual location of the virtual object.

12. The machine-readable medium of claim 8, wherein dynamically applying the body warping to adjust the location of the virtual hand within the virtual environment further comprises:
    determining a virtual vector that represents a distance and direction between the location of the virtual hand and the virtual location of the virtual object;
    determining a physical vector that represents a distance and direction between the current location of the physical hand of the user and the physical location of the physical object; and
    dynamically applying the body warping to adjust the location of the virtual hand within the virtual environment based at least in part on a difference between the virtual vector and the physical vector.

13. The machine-readable medium of claim 8, wherein applying the body warping comprises further comprises:
   applying a translation to the virtual hand to adjust the location of the virtual hand within the virtual environment; and
   applying a rotation to the virtual hand.

14. The machine-readable medium of claim 8, the operations further comprising:
   repeatedly applying a body warping as the physical hand of the user reaches toward the virtual object such that the location of the virtual hand intersects with the virtual location of the virtual object at substantially the same time that a current location of the physical hand of the user intersects with the physical location of the physical object.

15. A system comprising:
   one or more processors; and
   one or more memories storing instructions which, when executed by the one or more hardware processors, cause the one or more hardware processors to perform operations comprising:
      determining, within a physical environment, a physical location of a physical object;
      determining, within a virtual environment mapped to the physical environment, a virtual location of a virtual object;
      determining that a physical hand of a user is reaching toward the virtual object;
      rendering, within the virtual environment, a virtual hand that represents at least a portion of the physical hand of the user while the physical hand of the user is reaching toward the virtual object;
      dynamically adjusting the virtual hand to cause the user to physically reach for the physical object while it appears that the virtual hand is reaching for the virtual object, wherein dynamically adjusting the virtual hand includes dynamically applying a body warping to adjust a location of the virtual hand within the virtual environment, wherein applying the body warping includes:
         calculating a warping ratio based on the physical location of the physical object, an initial location of the physical hand of the user, and a current location of the physical hand of the user; and
         adjusting the location of the virtual hand within the virtual environment based, at least in part, on the warping ratio.

16. The system of claim 15, the operations further comprising:
   mapping the virtual environment to the physical environment to establish an alignment between the virtual environment and the physical environment.

17. The system of claim 15, the operations further comprising:
   dynamically adjusting the alignment between the virtual environment and the physical environment to reduce the difference between the physical location and the virtual location.

18. The system of claim 15, wherein dynamically adjusting the virtual hand to cause the user to physically reach for the physical object is based, at least in part, on a difference between the physical location of the physical object and the virtual location of the virtual object.

19. The system of claim 15, wherein dynamically applying the body warping to adjust the location of the virtual hand within the virtual environment further comprises:
   determining a virtual vector that represents a distance and direction between the location of the virtual hand and the virtual location of the virtual object;
   determining a physical vector that represents a distance and direction between the current location of the physical hand of the user and the physical location of the physical object; and
   dynamically applying the body warping to adjust the location of the virtual hand within the virtual environment based at least in part on a difference between the virtual vector and the physical vector.

20. The system of claim 15, wherein applying the body warping comprises further comprises:
   applying a translation to the virtual hand to adjust the location of the virtual hand within the virtual environment; and
   applying a rotation to the virtual hand.

* * * * *